(12) United States Patent
Xiao

(10) Patent No.: US 12,189,928 B2
(45) Date of Patent: Jan. 7, 2025

(54) COLLECTION MANAGEMENT METHOD AND APPARATUS, DEVICE, AND MEDIUM

(71) Applicant: Douyin Vision Co., Ltd., Beijing (CN)

(72) Inventor: Yuan Xiao, Beijing (CN)

(73) Assignee: Douyin Vision Co., Ltd., Beijing (CN)

( * ) Notice: Subject to any disclaimer, the term of this patent is extended or adjusted under 35 U.S.C. 154(b) by 0 days.

(21) Appl. No.: 18/323,874

(22) Filed: May 25, 2023

(65) Prior Publication Data

US 2024/0152255 A1 May 9, 2024

(30) Foreign Application Priority Data

Oct. 26, 2022 (CN) .......................... 202211320337.1

(51) Int. Cl.
*G06F 17/00* (2019.01)
*G06F 3/0482* (2013.01)
*G06F 3/0483* (2013.01)
*G06F 3/0484* (2022.01)

(52) U.S. Cl.
CPC .......... *G06F 3/0483* (2013.01); *G06F 3/0482* (2013.01); *G06F 3/0484* (2013.01)

(58) Field of Classification Search
CPC .... G06F 3/0483; G06F 3/0482; G06F 3/0484; G06F 9/451; G06F 16/9535; G06F 16/9538; G06Q 30/0201; G06Q 30/0251; G06Q 50/01
See application file for complete search history.

(56) References Cited

U.S. PATENT DOCUMENTS

| | | | |
|---|---|---|---|
| 11,175,799 B1 | 11/2021 | Deák | |
| 11,200,547 B2* | 12/2021 | Xu | G06Q 30/0279 |
| 11,227,245 B2* | 1/2022 | Standefer, III | G06Q 10/0633 |
| 11,307,752 B2* | 4/2022 | Meyer | G06F 9/451 |
| 2015/0280999 A1* | 10/2015 | Chart | H04L 41/12 709/224 |

(Continued)

FOREIGN PATENT DOCUMENTS

| | | |
|---|---|---|
| CN | 107085617 A | 8/2017 |
| CN | 107229637 A | 10/2017 |

(Continued)

OTHER PUBLICATIONS

CN117009421A, Duan, English translation, filed Jun. 17, 2022, pp. 1-33 (Year: 2022).*

(Continued)

*Primary Examiner* — Laurie A Ries

(57) ABSTRACT

Provided are a collection management method and apparatus, a device, and a storage medium. The method includes, in response to a collection control triggering operation, when a collection operation object corresponding to the collection control triggering operation is in a collected state, determining collection association information corresponding to the collection control triggering operation; and generating a collection association page based on the collection association information, and displaying the collection association page in an interaction interface. When a triggering operation on a collection control is detected, the collection association information is acquired, and the association page is generated for display.

16 Claims, 5 Drawing Sheets

(56) References Cited

U.S. PATENT DOCUMENTS

2023/0342009 A1* 10/2023 De Jong ............... G06F 3/0484

FOREIGN PATENT DOCUMENTS

| CN | 108304705 | A | * | 7/2018 | |
|---|---|---|---|---|---|
| CN | 108540848 | A | | 9/2018 | |
| CN | 109190076 | A | | 1/2019 | |
| CN | 109388761 | A | | 2/2019 | |
| CN | 111259274 | A | | 6/2020 | |
| CN | 109165320 | B | * | 4/2021 | ........... G06F 3/0484 |
| CN | 112632433 | A | | 4/2021 | |
| CN | 113423019 | A | * | 9/2021 | ......... G06F 16/9535 |
| CN | 114756781 | A | * | 7/2022 | ............. G06F 16/00 |
| CN | 115174733 | A | * | 10/2022 | ......... G06F 3/04847 |
| CN | 115599266 | A | | 1/2023 | |
| CN | 115796983 | A | * | 3/2023 | |
| CN | 117009421 | A | * | 11/2023 | |
| WO | WO-2015070698 | A1 | * | 5/2015 | ........ G06F 17/30011 |
| WO | WO-2020214864 | A1 | * | 10/2020 | ............. G06F 3/016 |

OTHER PUBLICATIONS

International Search Report dated Nov. 20, 2023 in PCT Appl. No. PCT/CN2023/118473, English translation (16 pages).
Bo, "Online reading boutique overspeed collection", Soft network life, Oct. 1, 2013, pp. 1-6.
Office action received from Chinese patent application No. 202211320337.1 mailed on Oct. 8, 2024, 18 pages (10 pages English Translation and 8 pages Original Copy).

* cited by examiner

COLLECTION MANAGEMENT METHOD AND APPARATUS, DEVICE, AND MEDIUM

CROSS-REFERENCE TO RELATED APPLICATION(S)

This application claims priority to Chinese Patent Application No. 202211320337.1 filed Oct. 26, 2022, the disclosure of which is incorporated herein by reference in its entirety.

TECHNICAL FIELD

Embodiments of the present disclosure relate to the field of computer technologies and, in particular, to a collection management method and apparatus, a device, and a medium.

BACKGROUND

With the development of content sharing applications, more and more users share personal created content, such as images, videos, and articles, through the content sharing applications. When a user is interested in the content in a content sharing application, the user may click a collection control to implement the collection of the content, thereby facilitating subsequent viewing. However, the operation manner of the current collection association operation is limited. The convenient management of the collection association operation cannot be implemented.

SUMMARY

The present disclosure provides a collection management method and apparatus, a device, and a medium to solve the technical problem of inconvenience in collection management.

In a first aspect, an embodiment of the present disclosure provides a collection management method. The collection management method includes, in response to a collection control triggering operation, when a collection operation object corresponding to the collection control triggering operation is in a collected state, determining collection association information corresponding to the collection control triggering operation; and generating a collection association page based on the collection association information, and displaying the collection association page in an interaction interface.

In a second aspect, an embodiment of the present disclosure also provides a collection management apparatus. The collection management apparatus includes a collection association information acquisition module and a collection association page display module.

The collection association information acquisition module is configured to, in response to a collection control triggering operation, determine collection association information corresponding to the collection control triggering operation when a collection operation object corresponding to the collection control triggering operation is in a collected state.

The collection association page display module is configured to generate a collection association page based on the collection association information and display the collection association page in an interaction interface.

In a third aspect, an embodiment of the present disclosure also provides an electronic device. The electronic device includes one or more processors and a storage apparatus.

The storage apparatus is configured to store one or more programs.

When executed by the one or more processors, the one or more programs cause the one or more processors to implement the collection management method provided in any embodiment of the present disclosure.

In a fourth aspect, an embodiment of the present disclosure also provides a storage medium containing a computer-executable instruction. When executed by a computer processor, the computer-executable instruction is configured to execute the collection management method provided in any embodiment of the present disclosure.

According to embodiments of the present disclosure, in response to a collection control triggering operation, when a collection operation object corresponding to the collection control triggering operation is in a collected state, collection association information corresponding to the collection control triggering operation is determined. A collection association page is generated based on the collection association information, and the collection association page is displayed in an interaction interface. When a triggering operation on a collection control is detected, the collection association information is acquired, and the association page is generated for display. Thus, when a user clicks the collection control, not only the collection operation of the collection operation object can be triggered, but also other collection association operations can be triggered. In this manner, the triggering manner of the collection management operation is added, and the convenient management of the collection association operation is implemented.

BRIEF DESCRIPTION OF DRAWINGS

The preceding and other features, advantages, and aspects of embodiments of the present disclosure become more apparent with reference to the implementations hereinafter in conjunction with drawings. Same or similar reference numerals in the drawings denote same or similar elements. It is to be understood that the drawings are illustrative and that originals and elements are not necessarily drawn to scale.

DETAILED DESCRIPTION

Figure 1:
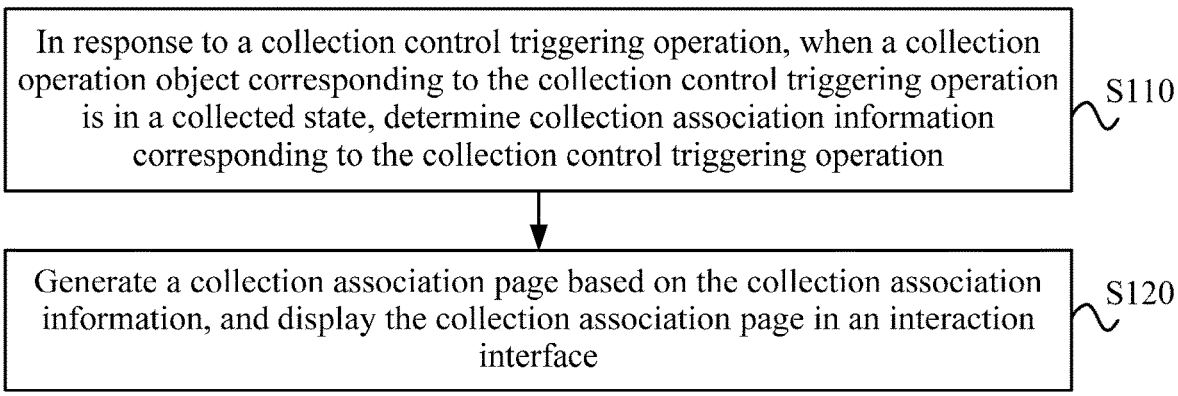
FIG. 1 is a flowchart of a collection management method according to an embodiment of the present disclosure.

Embodiments of the present disclosure are described in more detail hereinafter with reference to the drawings. Although some embodiments of the present disclosure are shown in the drawings, it is to be understood that the present disclosure may be implemented in various forms and should not be construed as limited to the embodiments set forth herein; conversely, these embodiments are provided so that the present disclosure is thoroughly and completely understood. It is to be understood that drawings and embodiments of the present disclosure are merely illustrative and are not intended to limit the scope of the present disclosure.

It is to be understood that various steps recited in the method embodiments of the present disclosure may be executed in a different order, and/or in parallel. In addition, the method embodiments may include additional steps and/or omit execution of illustrated steps. The scope of the present disclosure is not limited in this respect.

As used herein, the term "comprise" and variations thereof are intended to be inclusive, that is, "including, but not limited to". The term "based on" is "at least partially based on". The term "an embodiment" refers to "at least one embodiment". The term "another embodiment" refers to "at least one another embodiment". The term "some embodiments" refers to "at least some embodiments". Related definitions of other terms are given in the description hereinafter.

It is to be noted that references to "first", "second", and the like in the present disclosure are merely intended to distinguish one from another apparatus, module, or unit and are not intended to limit the order or interrelationship of the functions executed by the apparatus, module, or unit.

It is to be noted that references to modifications of "one" or "a plurality" in the present disclosure are intended to be illustrative and not limiting, and that those skilled in the art should understand that "one" or "a plurality" should be understood as "one or more" unless clearly expressed in the context.

The names of messages or information exchanged between multiple apparatuses in embodiments of the present disclosure are only for illustrative purposes and are not intended to limit the scope of such messages or information.

It is to be understood that prior to the use of the technical solutions provided in the embodiments of the present disclosure, the type, scope of use, scenario of use, and the like of the personal information to which the present disclosure relates should be notified to users and authorized by the users in an appropriate manner in accordance with the relevant laws and regulations.

For example, prompt information may be sent to a user to explicitly prompt the user that the operation requested by the user to execute needs to acquire and use personal information of the user. Thus, the user can freely choose, according to the prompt information, whether to provide personal information to software or hardware such as an electronic device, an application program, a server, or a storage medium that executes the operation of the technical solutions in the present disclosure.

As an optional, but not limiting, embodiment, the prompt information may be sent to the user in a manner such as a pop-up window in which the prompt information may be presented in the form of text. In addition, the pop-up window can also carry a selection control for the user to choose "agree" or "disagree" to provide personal information to the electronic device.

It is to be understood that the preceding processes of notification and acquiring user authorization are merely illustrative and do not constitute a limitation on the embodiments of the present disclosure. Other manners meeting the relevant laws and regulations may be applied to the embodiments of the present disclosure.

FIG. 1 is a flowchart of a collection management method according to an embodiment of the present disclosure. This embodiment of the present disclosure is applicable to the case where a collection association operation is triggered for interaction. The method may be executed by a collection management apparatus which may be implemented in the form of software and/or hardware. Optionally, the collection management apparatus may be implemented by an electronic device which may be a mobile terminal, a PC terminal, or a server. Any collection association operation is typically implemented by the cooperation of a client and a server. The method provided in this embodiment may be executed by the server, by the client, or by the cooperation of the client and the server.

As shown in FIG. 1, the method includes the following steps.

In S110, in response to a collection control triggering operation, when a collection operation object corresponding to the collection control triggering operation is in a collected state, collection association information corresponding to the collection control triggering operation is determined.

The execution for a collection management apparatus provided in this embodiment of the present disclosure may be integrated in an application software supporting an interaction function. The software may be installed in an electronic device. Optionally, the electronic device may be a mobile terminal, a PC terminal, or the like. The application software may be a content sharing software, such as a picture sharing software, a video sharing software, or an article sharing software.

In this embodiment, a user can trigger a collection control in an interaction interface to trigger the collection control triggering operation. After detecting the collection control triggering operation initiated by the user, the collection management apparatus determines the collection state of a collection operation object corresponding to the collection control triggering operation and executes the corresponding operation based on the collection state of the collection operation object. The collection control is a control for triggering the collection operation or collection cancellation operation of the collection operation object. The user may implement the collection operation or collection cancellation of the collection operation object through the corresponding triggering operation. For example, in the case where the collection operation object is in an uncollected state, the user can implement the collection operation on the collection operation object by clicking the collection control and implement the collection-collection cancellation operation on the collection operation object by double-clicking the collection control. That is, the collection control triggering operation includes a click operation on the collection control. The click operation includes a single click operation and multiple click operations. Different click operations correspond to different collection operation instructions.

It is to be understood that when the collection operation object is in an uncollected state, the user triggers the collection control triggering operation to complete the collection of the collection operation object. Therefore, when the collection operation object is in the uncollected state, the collection operation on the collection operation object can be directly executed.

When the collection operation object is in a collected state, the requirement of the user triggering the collection control triggering operation may be canceling the collection for the collection operation object. However, in view of other requirements that the user may have, this embodiment provides a technical idea for displaying a collection association page, facilitating the management of the user for collection association information. In this embodiment, when the collection operation object is in the collected state and the collection control triggering operation is detected, a management operation on the collection association information is triggered on the basis of triggering the association operation of collection cancellation. Thus, the user can enter a collection association information management page by clicking to cancel collection and execute the management operation on the collection association information. In this manner, more entries are provided for the management of collection association information, thereby facilitating the management of collection association information.

The collection association information may be information related to the collection operation or collection cancellation operation, such as at least one piece of collection folder information, collection category information, collection management information, or collection cancellation information. The collection association information may be acquired locally at the client. Moreover/alternatively, the collection association information may be acquired by requesting the server. This is not limited herein.

In S120, a collection association page is generated based on the collection association information, and the collection association page is displayed in an interaction interface.

In this embodiment, after the collection association information is determined, the collection association page is obtained by rendering based on the collection association information. Moreover, the collection association page is displayed in the interaction interface.

For a manner in which the collection association page is obtained by rendering based on the collection association information, reference may be made to the rendering manner in the related art, as long as the rendering of the collection association page can be implemented. This is not limited herein.

According to this embodiment of the present disclosure, in response to a collection control triggering operation, when a collection operation object corresponding to the collection control triggering operation is in a collected state, collection association information corresponding to the collection control triggering operation is determined. A collection association page is generated based on the collection association information, and the collection association page is displayed in an interaction interface. When a triggering operation on a collection control is detected, the collection association information is acquired, and the association page is generated for display. Thus, when a user clicks the collection control, not only the collection operation on the collection operation object can be triggered, but also other collection association operations can be triggered. In this manner, the operation manner of the collection management is added, and the convenient management of the collection association operation is implemented.

Figure 2A:
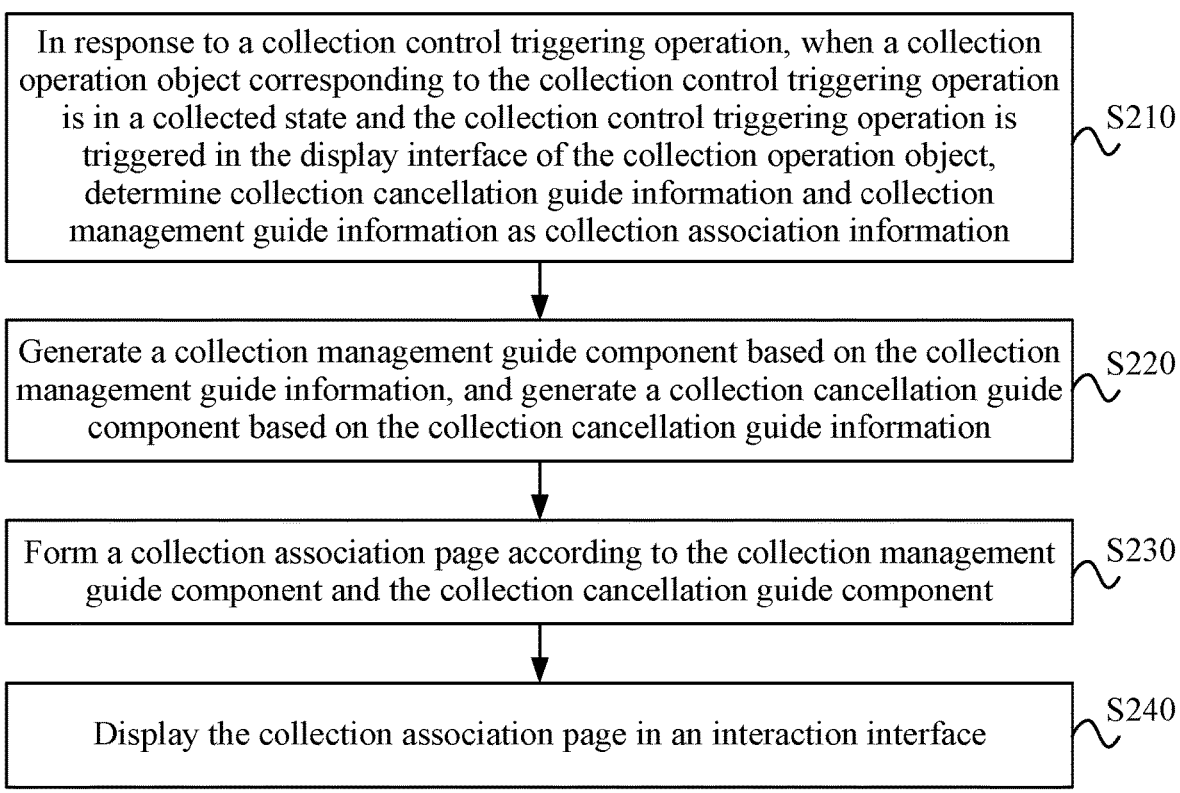
FIG. 2A is a flowchart of another collection management method according to an embodiment of the present disclosure.

FIG. 2A is a flowchart of another collection management method according to an embodiment of the present disclosure. This embodiment of the present disclosure further optimizes determination of collection association information and generation of a collection association page. As shown in FIG. 2A, the method includes the following steps.

In S210, in response to a collection control triggering operation, when a collection operation object corresponding to the collection control triggering operation is in a collected state and the collection control triggering operation is triggered in the display interface of the collection operation object, collection cancellation guide information and collection management guide information are determined as collection association information.

In this embodiment, different collection association pages are displayed for different operation triggering interfaces.

When the collection control triggering operation is triggered in the display interface of the collection operation object, it is noted that the user clicks the collection control in the display interface of the collection operation object. The user requirement may be canceling the collection of the collection operation object or managing collection information. The display interface of the collection operation object varies with the collection operation object. When the collection operation object is a picture, the display interface of the collection operation object may be a picture display interface. When the collection operation object is a video, the display interface of the collection operation object may be a video playing interface. When the collection operation object is an article, the display interface of the collection operation object may be an article display interface.

The basic requirement for the user to trigger the collection control triggering operation is to cancel the collection of the collection operation object. Therefore, the collection cancellation guide information needs to be acquired as collection management information. The collection cancellation guide information may be text information describing "collection cancellation". The specific content of the text information may be determined according to the display language of an application program and may be description information of "collection cancellation" through the display language. Assuming that the display language of the application program is Chinese, the collection cancellation guide information may be "取消收藏". Assuming that the display language of the application program is English, the collection cancellation guide information may be "Cancel the save". On the basis of the text information, symbol information (such as "x") may also be set as the collection cancellation guide information so that the collection cancellation guide information is more obvious.

The requirement for the user to trigger the collection control triggering operation may also be managing the collection information. Based on this, the collection management guide information needs to be acquired as the collection management information. The collection management guide information may be text information describing "collection management". The specific content of the text information may be determined according to the display language of an application program and may be description information of "collection management" through the display language. Assuming that the display language of the application program is Chinese, the collection cancellation guide information may be "添加至收藏". Assuming that the display language of the application program is English, the collection cancellation guide information may be "Add to collection". On the basis of the text information, symbol information (such as "+") may also be set as the collection management guide information so that the collection management guide information is more obvious.

In S220, a collection management guide component is generated based on the collection management guide information, and a collection cancellation guide component is generated based on the collection cancellation guide information.

After the collection management guide information and the collection cancellation guide information are determined, the collection management guide component is generated based on the collection management guide information, and the collection cancellation guide component is generated based on the collection cancellation guide information. The collection management guide component is configured to guide the user to manage the collection object. The collection cancellation guide component is configured to guide the user to cancel the collection operation on the collection operation object. The user may select the collection management guide component to trigger the collection management operation or select the collection cancellation guide component to trigger the collection cancellation operation on the collection operation object. For the generation manners of the collection management guide component and collection cancellation guide component, reference may be made to the component generation manner in the related art. Details are not described herein.

In S230, a collection association page is formed according to the collection management guide component and the collection cancellation guide component.

After the collection management guide component and the collection cancellation guide component are obtained, the collection association page is obtained by combining the collection management guide component and the collection cancellation guide component. In an embodiment, the collection management guide component and the collection cancellation guide component may be displayed in the collection association page according to a preset position relationship. Optionally, the preset position relationship may be a parallel relationship, an up-down relationship, a random part non-overlapping relationship, or the like.

Figure 2B:
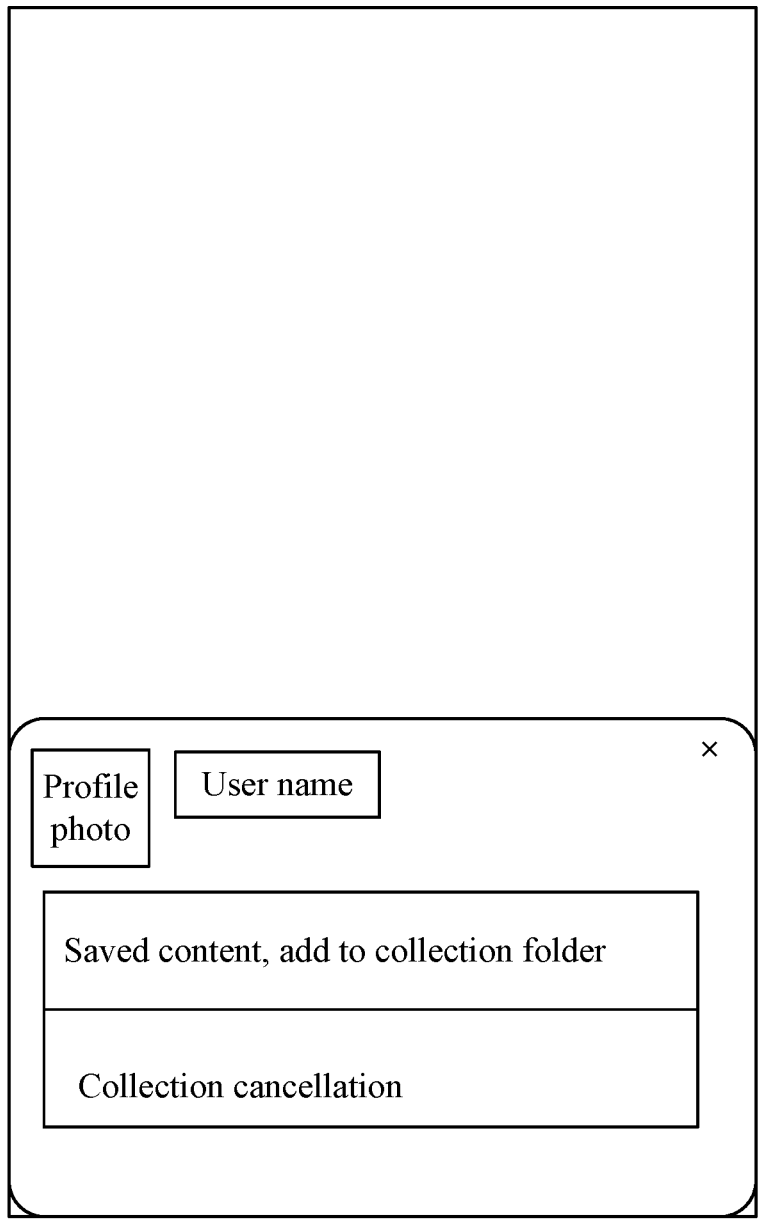
FIG. 2B is a page diagram showing a collection association page according to an embodiment of the present disclosure.

FIG. 2B is a page diagram showing a collection association page according to an embodiment of the present disclosure. A diagram of a collection association page is illustratively shown in FIG. 2B. As shown in FIG. 2B, the collection association page is composed of a collection management guide component "saved content, add to collection folder" and a collection cancellation guide component "collection cancellation" which are in the up-down relationship.

In S240, the collection association page is displayed in an interaction interface.

According to this embodiment of the present disclosure, when the collection control triggering operation is triggered in the display interface of the collection operation object, the collection cancellation guide information and the collection management guide information are determined as the collection association information. The collection management guide component is generated based on the collection management guide information. The collection cancellation guide component is generated based on the collection cancellation guide information. The collection association page is formed according to the collection management guide component and the collection cancellation guide component. When the collection control is triggered in the display interface of the collection operation object, the corresponding display of the collection management is implemented on the basis of canceling the collection control, thereby providing a new entry for the collection management and improving the convenience of the collection management.

On the basis of the preceding solutions, the method also includes, in response to a management component triggering operation on the collection management guide component, determining an operation user identifier corresponding to the management component triggering operation; and determining a reference collection category corresponding to the operation user identifier, generating a collection category management page based on the reference collection category, and displaying the collection category management page in an interaction interface.

After the collection association page is displayed, the user can trigger the collection management guide component or collection cancellation guide component in the collection association page to execute the corresponding operation. Specifically, the user can trigger the collection cancellation guide component to execute the collection cancellation operation on the operation triggering object. The user can also trigger the collection management guide component to execute the collection management operation. In this case, the collection category management page can be displayed to complete the management of the collection category. In this case, collection category information needs to be obtained. The user can trigger the collection cancellation guide component by selecting and triggering the collection cancellation guide component. The user can trigger the collection cancellation guide component by selecting the collection cancellation guide component. The selection may be clicking, multi-clicking, or long pressing.

Optionally, the reference collection category corresponding to the user identifier may be understood as a collection category set by the user according to the collection information of the user. Obviously, reference collection categories of different users are different. Based on this, to obtain the reference collection category corresponding to a user, the operation user identifier corresponding to the management component triggering operation needs to be determined first. The operation user identifier corresponding to the management component triggering operation may be determined by the user identifier currently logged in an application program. That is, the user identifier currently logged in is used as the operation user identifier corresponding to the management component triggering operation.

When a client stores the reference collection category corresponding to the operation user identifier, the reference collection category can be directly obtained locally at the client according to the operation user identifier. When the client does not store the reference collection category corresponding to the operation user identifier, a reference category acquisition request carrying the operation user identifier can be generated. The reference category acquisition request is sent to a server. The reference collection category returned by the server is received. After the reference collection category is determined, the collection category management page is obtained based on the rendering of the reference collection category. For a specific rendering manner, reference may be made to the rendering manner in the related art. This is not limited herein. The reference collection category may include a reference collection category name and a reference collection category image. A triggering operation on the collection management guide component is detected. Then, the collection category management page is displayed to complete the management of the collection category or the category management of the collection operation object. A new entry for collection category management is provided.

On the basis of the preceding solutions, the method also includes, in response to a selection operation on the reference collection category in the collection category management page, determining a selected reference collection category; and acquiring a selected reference category collection object corresponding to the selected reference collection category, generating a collection category display page based on the selected reference category collection object and the collection operation object, and displaying the collection category display page in an interaction interface.

After the collection category management page is displayed, when the user needs to manage a certain reference collection category, a reference collection category to be managed can be selected in the collection category management page. After detecting the selection operation of the reference collection category, a collection management apparatus acquires the selected reference category collection object corresponding to the selected reference collection category. The collection category display page is obtained by rendering based on the selected reference category collection object for display. The selection operation may be any operation such as clicking, multi-clicking, or long pressing.

Optionally, the selected reference category collection object may be acquired locally at the client or may be acquired by sending a request carrying the category identifier of the selected reference collection category to the server. This is not limited herein. The category management of the reference collection category in the page can be implemented through the collection category management page, thereby providing a new entry for management of the collection category and the collection object.

On the basis of the preceding solutions, the method also includes, in response to a selection operation on the reference collection category in the collection category management page, determining a selected reference collection category; acquiring an association collection category corresponding to the collection operation object; and generating a collection category recommendation page based on the selected reference collection category and the association collection category, and displaying the collection category recommendation page in an interaction interface.

This embodiment also provides a push method for recommending a collection category. After a selection operation of a reference collection category triggered by a user is detected, another collection category collecting a collection operation object by the user is acquired as an association collection category. Then, a collection category recommendation page is obtained based on the rendering of the collection category and the association collection category. In an embodiment, a reference collection category component can be obtained based on the rendering of the reference collection category. The association collection category component can be obtained based on the rendering of the association collection category. Then, the reference collection category component and the association collection category component are displayed in a collection association page according to a preset position relationship. Optionally, the preset position relationship may be a parallel relationship, an up-down relationship, a random part non-overlapping relationship, or the like. For the rendering manners of the reference collection category component and association collection category component, reference may be made to the rendering manner in the related art. This is not limited herein. The recommendation display of the association collection category associated with the collection operation object can be implemented through the triggering operation of the collection category recommendation page. Thus, the user can acquire the association information of the collection operation object, and the corresponding push of the association information is implemented.

It is to be noted that prompt information needs to be sent to the user to inform the user of the application scenario of the collected personal information. Moreover, the collection category of the user is obtained after the user authorization is obtained.

Figure 2C:
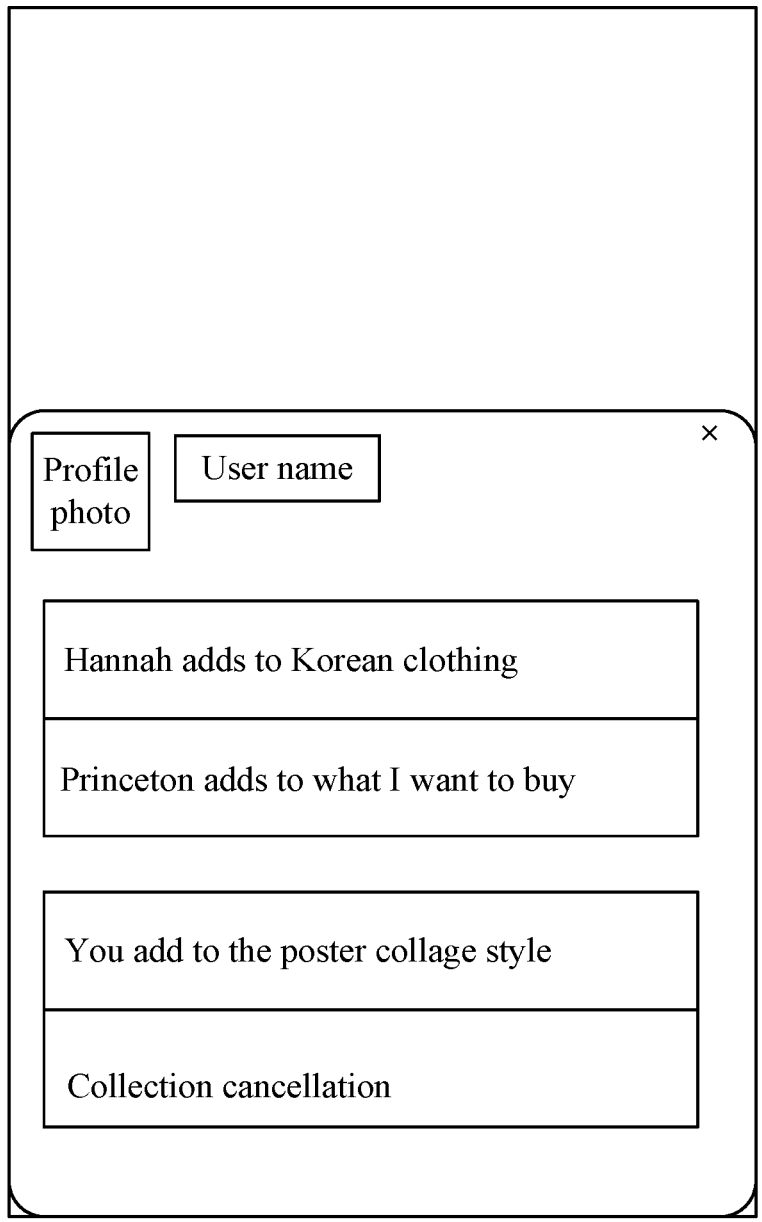
FIG. 2C is a page diagram showing a collection category recommendation page according to an embodiment of the present disclosure.

FIG. 2C is a page diagram showing a collection category recommendation page according to an embodiment of the present disclosure. A diagram of a collection category recommendation page is illustratively shown in FIG. 2C. As shown in FIG. 2C, the collection category recommendation page is composed of an association collection category component "Hannah adds to Korean clothing" and "Princeton adds to what I want to buy", a reference collection category component "You add to the poster collage style", and a collection cancellation guide component "collection cancellation" which are in the up-down relationship.

On the basis of the preceding solutions, the method also includes, in response to a selection operation on the association collection category in the collection category recommendation page, determining a selected association collection category; acquiring a selected association category collection object corresponding to the selected association collection category; and generating a collection object recommendation page based on the selected association category collection object, and displaying the collection object recommendation page in an interaction interface. It is to be understood that the purpose of pushing the association collection category for a user is to recommend the object associated with a collection operation object for the user. Based on this, after the collection category recommendation page is displayed, the user can select the association collection category in the collection category recommendation page to trigger the display operation of the object corresponding to the association collection category. The recommendation display of the selected association category collection object corresponding to the association collection category can be implemented through the trigger operation of an association collection category display component. Thus, the user can acquire the selected association category collection object associated with the collection operation object, and the corresponding push of the association object can be implemented.

Optionally, an object acquisition request carrying the selected association collection category can be generated and then sent to a server. The object information returned by the server is acquired as the selected association category collection object. Then, the collection object recommendation page is obtained by rendering based on the selected association category collection object. After the collection object recommendation page is displayed, the user can execute collection, viewing, and other operations on interesting collection objects. Taking an image sharing application as an example, the selected association category collection object may include a display image of the collection object, description information of the collection object, association collection category information, and the like.

Figure 3:
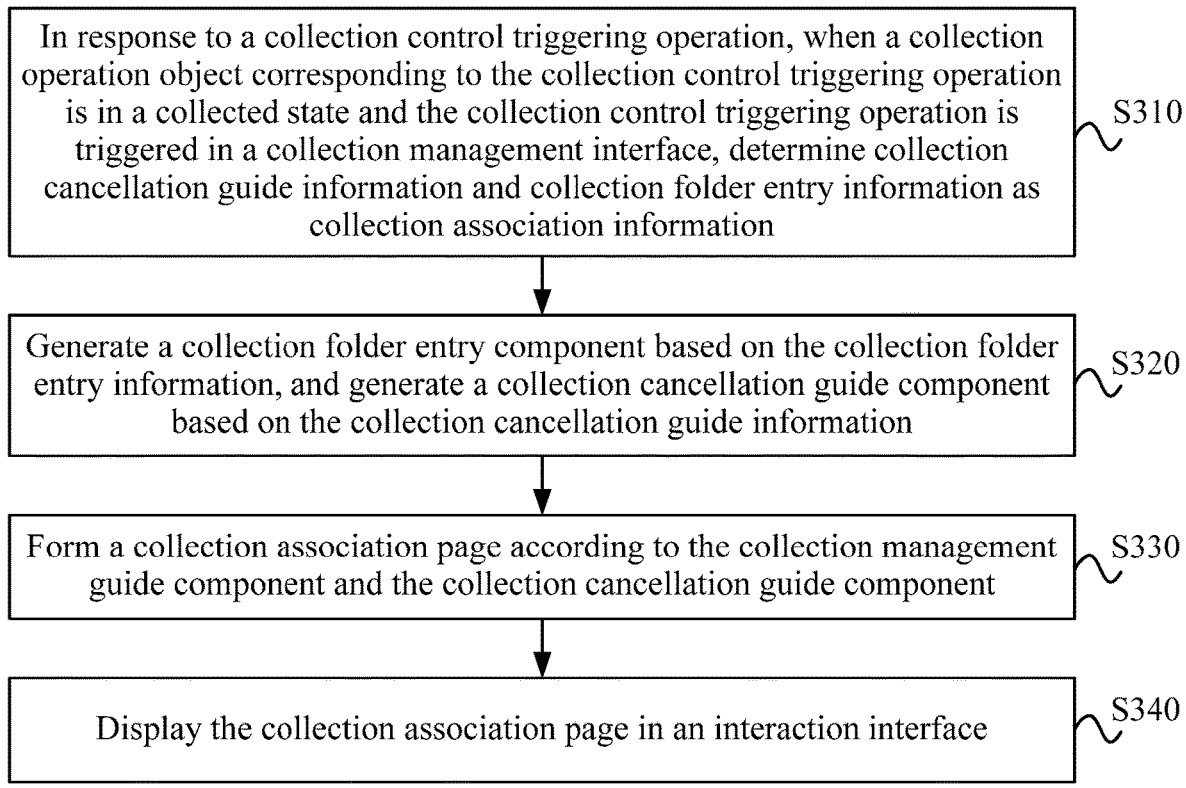
FIG. 3 is a flowchart of another collection management method according to an embodiment of the present disclosure.

FIG. 3 is a flowchart of another collection management method according to an embodiment of the present disclosure. This embodiment of the present disclosure further optimizes determination of collection association information and generation of a collection association page. As shown in FIG. 3, the method includes the following steps.

In S310, in response to a collection control triggering operation, when a collection operation object corresponding to the collection control triggering operation is in a collected state and the collection control triggering operation is triggered in a collection management interface, collection cancellation guide information and collection folder entry information are determined as collection association information.

When the collection control triggering operation is triggered in the collection management interface, it is noted that the user clicks a collection control in the collection management interface. That is, the interface is currently in a collection management state. At this time, the user requirement may be canceling the collection of the collection operation object. To further improve the convenience of collection folder management, after the user clicks the collection control in the collection management interface, a collection folder entry component can be displayed on the basis of canceling a collection display component.

The basic requirement for the user to trigger the collection control triggering operation is to cancel the collection of the collection operation object. Therefore, the collection cancellation guide information needs to be acquired as collection management information. The collection cancellation guide information may be text information describing "collection cancellation". The specific content of the text information may be determined according to the display language of an application program and may be description information of "collection cancellation" through the display language. Assuming that the display language of the application program is Chinese, the collection cancellation guide information may be "取消收藏". Assuming that the display language of the application program is English, the collection cancellation guide information may be "Cancel the save". On the basis of the text information, symbol information (such as "x") may also be set as the collection cancellation guide information so that the collection cancellation guide information is more obvious.

To provide the user with an entry to the collection folder through the collection management interface, in this embodiment, the user triggers the collection control to acquire the collection folder entry information as the collection management information. The collection folder entry information may be text information describing the "collection folder". The specific content of the text information may be determined according to the display language of an application program and may be description information of the "collection folder" through the display language. Assuming that the display language of the application program is Chinese, the collection cancellation guide information may be the "collection folder".

In S320, a collection folder entry component is generated based on the collection folder entry information, and a collection cancellation guide component is generated based on the collection cancellation guide information.

After the collection folder entry information and the collection cancellation guide information are determined, the collection folder entry component is generated based on the collection folder entry information, and the collection cancellation guide component is generated based on the collection cancellation guide information. The collection folder entry component is configured to guide the user into the collection folder. The collection cancellation guide component is configured to guide the user to cancel the collection operation on the collection operation object. The user may select the collection folder entry component to trigger the operation of entering the collection folder or select the collection cancellation guide component to trigger the collection cancellation operation on the collection operation object. For the generation manners of the collection folder entry component and collection cancellation guide component, reference may be made to the component generation manner in the related art. Details are not described herein.

In S330, a collection association page is formed according to the collection management guide component and the collection cancellation guide component.

After the collection folder entry component and the collection cancellation guide component are obtained, the collection association page is obtained by combining the collection folder entry component and the collection cancellation guide component. In an embodiment, the collection folder entry component and the collection cancellation guide component may be displayed in the collection association page according to a preset position relationship. Optionally, the preset position relationship may be a parallel relationship, an up-down relationship, a random part non-overlapping relationship, or the like.

In S340, the collection association page is displayed in an interaction interface.

According to the technical solutions in this embodiment of the present disclosure, when the collection control triggering operation is triggered in the collection management interface, the collection cancellation guide information and the collection folder entry information are determined as the collection association information. The collection folder entry component is generated based on the collection folder entry information. The collection cancellation guide component is generated based on the collection cancellation guide information. The collection association page is formed according to the collection management guide component and the collection cancellation guide component. When the collection control is triggered in the collection management interface, the corresponding display of the collection folder entry is implemented on the basis of canceling the collection control, thereby providing a new entry for the collection folder and improving the convenience of the collection management.

On the basis of the preceding solutions, the method also includes, in response to an entry triggering operation on the collection folder entry component, determining an operation user identifier corresponding to the entry triggering operation; acquiring collection folder display information corresponding to the operation user identifier; and generating a collection folder display page based on the collection folder display information, and displaying the collection folder display page in an interaction interface.

After the collection association page is displayed, the user can trigger the collection folder entry component in the collection association page to execute the operation entering the collection folder. The user can trigger the collection folder entry component by selecting the collection folder entry component. The selection operation may be an operation such as clicking, multi-clicking, or long pressing. After the entry triggering operation initiated by the user is detected, the user identifier currently logged in is determined as the operation user identifier. The collection folder display information corresponding to the operation user identifier is acquired. The collection folder display page is obtained by rendering based on the collection folder display information for display.

When a client stores the collection folder display information corresponding to the operation user identifier, the collection folder display information can be directly obtained locally at the client according to the operation user identifier. When the client does not store the collection folder display information corresponding to the operation user identifier, a collection folder display information acquisition request carrying the operation user identifier can be generated. The collection folder display information acquisition request is sent to a server. The collection folder display information returned by the server is received. After the collection folder display information is determined, the collection folder display page is obtained based on the collection folder display information. For a specific rendering manner, reference may be made to the rendering manner in the related art. This is not limited herein. By detecting the entry triggering operation on the collection folder entry component, the collection folder display page is displayed to complete the viewing of the collection folder display information. Moreover, a new entry of the collection folder is provided to facilitate execution of the operation entering the collection folder.

Figure 4:
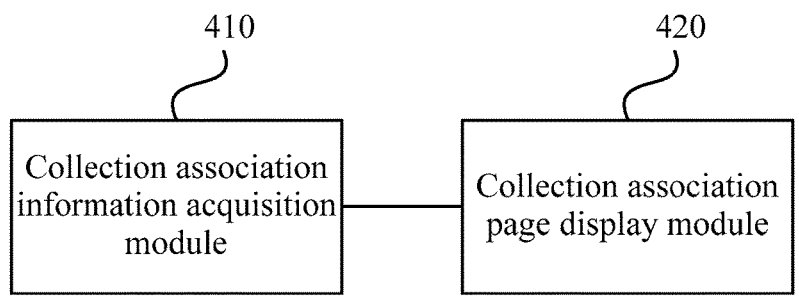
FIG. 4 is a diagram illustrating the structure of a collection management apparatus according to an embodiment of the present disclosure.

FIG. 4 is a diagram illustrating the structure of a collection management apparatus according to an embodiment of the present disclosure. As shown in FIG. 4, the apparatus includes a collection association information acquisition module 410 and a collection association page display module 420.

The collection association information acquisition module 410 is configured to, in response to a collection control triggering operation, determine collection association information corresponding to the collection control triggering operation when a collection operation object corresponding to the collection control triggering operation is in a collected state.

The collection association page display module 420 is configured to generate a collection association page based on the collection association information and display the collection association page in an interaction interface.

According to the technical solutions provided in this embodiment of the present disclosure, in response to a collection control triggering operation, when a collection operation object corresponding to the collection control triggering operation is in a collected state, collection association information corresponding to the collection control triggering operation is determined. A collection association page is generated based on the collection association information, and the collection association page is displayed in an interaction interface. When a triggering operation on a collection control is detected, the collection association information is acquired, and the association page is generated for display. Thus, when a user clicks the collection control, not only the collection operation on the collection operation object can be triggered, but also other collection association operations can be triggered. In this manner, the operation manner of the collection management is added, and the convenient management of the collection association operation is implemented.

On the basis of any optional technical solution in the embodiments of the present disclosure, optionally, the collection control triggering operation includes a click operation on the collection control. The click operation includes a single click operation and multiple click operations.

On the basis of any optional technical solution in the embodiments of the present disclosure, optionally, the collection association information acquisition module 410 is specifically configured to, when the collection control triggering operation is triggered in a display interface of a collection operation object, determine collection cancellation guide information and collection management guide information as the collection association information.

Correspondingly, the collection association page display module 420 is specifically configured to generate a collection management guide component based on the collection management guide information and generate a collection cancellation guide component based on the collection cancellation guide information, where the collection management guide component is configured to guide a user to manage a collection object, and the collection cancellation guide component is configured to guide the user to cancel a collection operation of the collection operation object; and form a collection association page according to the collection management guide component and the collection cancellation guide component.

On the basis of any optional technical solution in the embodiments of the present disclosure, optionally, the apparatus also includes a category management page display module. The category management page display module is configured to, in response to a management component triggering operation on the collection management guide component, determine an operation user identifier corresponding to the management component triggering operation; and determine a reference collection category corresponding to the operation user identifier, generate a collection category management page based on the reference collection category, and display the collection category management page in an interaction interface.

On the basis of any optional technical solution in the embodiments of the present disclosure, optionally, the apparatus also includes a collection category page display module. The collection category page display module is configured to, in response to a selection operation on the reference collection category in the collection category management page, determine a selected reference collection category; and acquire a selected reference category collection object corresponding to the selected reference collection category, generate a collection category display page based on the selected reference category collection object and the collection operation object, and display the collection category display page in an interaction interface.

On the basis of any optional technical solution in the embodiments of the present disclosure, optionally, the apparatus also includes an association category recommendation module. The association category recommendation module is configured to, in response to a selection operation on the reference collection category in the collection category management page, determine a selected reference collection category; acquire an association collection category corresponding to the collection operation object; and generate a collection category recommendation page based on the selected reference collection category and the association collection category, and display the collection category recommendation page in an interaction interface.

On the basis of any optional technical solution in the embodiments of the present disclosure, optionally, the apparatus also includes a collection object recommendation page display module. The collection object recommendation page display module is configured to, in response to a selection operation on the association collection category in the collection category recommendation page, determine a selected association collection category; acquire a selected association category collection object corresponding to the selected association collection category; and generate a collection object recommendation page based on the selected association category collection object, and display the collection object recommendation page in an interaction interface.

On the basis of any optional technical solution in the embodiments of the present disclosure, optionally, the collection association information acquisition module 410 is specifically configured to, when the collection control triggering operation is triggered in a collection management interface, determine collection cancellation guide information and collection folder entry information as the collection association information.

Correspondingly, the collection association page display module 420 is specifically configured to generate a collection folder entry component based on the collection folder entry information, and generate a collection cancellation guide component based on the collection cancellation guide information, where the collection cancellation guide component is configured to guide a user to cancel a collection operation on the collection operation object; and form a collection association page according to the collection management guide component and the collection cancellation guide component.

On the basis of any optional technical solution in the embodiments of the present disclosure, optionally, the apparatus also includes a collection folder display module. The collection folder display module is configured to, in response to an entry component triggering operation on the collection folder entry component, determine an operation user identifier corresponding to the entry component triggering operation; acquire collection folder display information corresponding to the operation user identifier; and generate a collection folder display page based on the collection folder display information, and display the collection folder display page in an interaction interface.

The collection management apparatus provided in the embodiments of the present disclosure can execute the collection management method provided in any embodiment of the present disclosure and has functional modules and beneficial effects corresponding to the execution methods.

It is to be noted that units and modules included in the preceding apparatus are just divided according to functional logic, and the division is not limited to this, as long as the corresponding functions can be implemented. Additionally, the specific names of the functional units are just intended for distinguishing and are not to limit the protection scope of the embodiments of the present disclosure.

Figure 5:
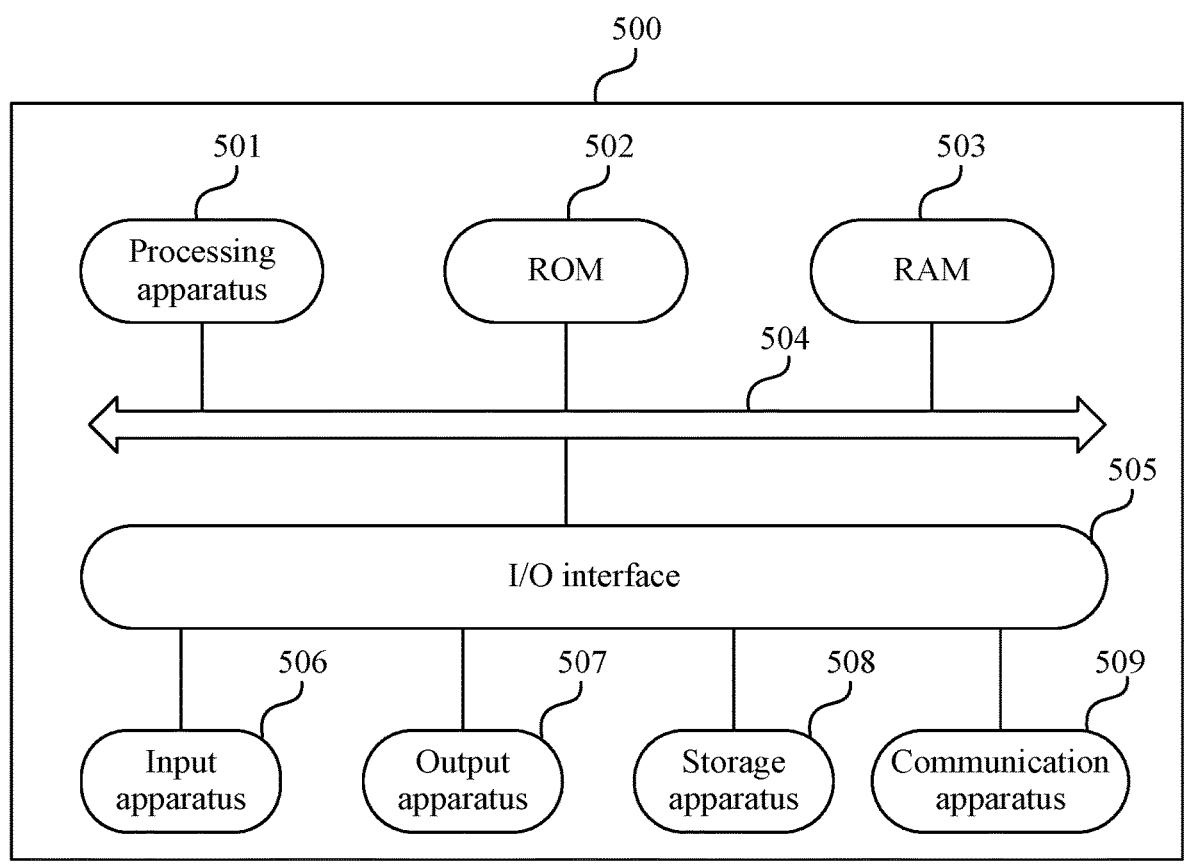
FIG. 5 is a diagram illustrating the structure of an electronic device according to an embodiment of the present disclosure.

FIG. 5 is a diagram illustrating the structure of an electronic device according to an embodiment of the present disclosure. Referring to FIG. 5, FIG. 5 shows a structural diagram of an electronic device 500 (such as a terminal device or server in FIG. 5) applicable to implementing the embodiments of the present disclosure. A terminal device in the embodiments of the present disclosure may include, but is not limited to, mobile terminals such as a mobile phone, a laptop, a digital broadcast receiver, a personal digital assistant (PDA), a PAD, a portable media player (PMP), and an in-vehicle terminal (such as an in-vehicle navigation terminal) and stationary terminals such as a digital television (TV) and a desktop computer. The electronic device shown in FIG. 5 is merely an example and is not intended to limit the function and usage scope of the embodiments of the present disclosure.

As shown in FIG. 5, the electronic device 500 may include a processing apparatus 501 (such as a central processing unit and a graphics processing unit). The processing apparatus 501 may execute various types of appropriate operations and processing based on a program stored in a read-only memory (ROM) 502 or a program loaded from a storage apparatus 508 to a random-access memory (RAM) 503. Various programs and data required for the operation of the electronic device 500 are also stored in the RAM 503. The processing apparatus 501, the ROM 502, and the RAM 503 are connected to each other through a bus 504. An input/output (I/O) interface 505 is also connected to the bus 504.

Generally, the following apparatus may be connected to the I/O interface 505: an input apparatus 506 such as a touch screen, a touch pad, a keyboard, a mouse, a camera, a microphone, an accelerometer, or a gyroscope; an output apparatus 507 such as a liquid crystal display (LCD), a speaker, or a vibrator; the storage apparatus 508 such as a magnetic tape or a hard disk, and a communication apparatus 509. The communication apparatus 509 may allow the electronic device 500 to perform wireless or wired communication with other devices to exchange data. Although FIG. 5 shows the electronic device 500 having various apparatuses, it is to be understood that not all of the apparatuses shown herein need to be implemented or present. Alternatively, more or fewer apparatuses may be implemented or present.

Particularly, according to the embodiments of the present disclosure, the process described above with reference to the flowchart may be implemented as a computer software program. For example, the embodiments of the present disclosure include a computer program product. The computer program product includes a computer program carried in a non-transitory computer-readable medium. The computer program includes program codes for executing the method shown in the flowchart. In such an embodiment, the computer program may be downloaded from a network and installed through the communication apparatus 509, or may be installed from the storage apparatus 508, or may be installed from the ROM 502. When the computer program is executed by the processing apparatus 501, the preceding functions defined in the method of the embodiments of the present disclosure are executed.

The names of messages or information exchanged between multiple apparatuses in the embodiments of the present disclosure are only for illustrative purposes and are not intended to limit the scope of such messages or information.

The electronic device provided in this embodiment of the present disclosure belongs to the same inventive concept as the collection management method provided in the preceding embodiments. For the technical details not described in detail in this embodiment, reference can be made to the preceding embodiments. This embodiment has the same beneficial effects as the preceding embodiments.

An embodiment of the present disclosure provides a computer storage medium storing a computer program which, when executed by a processor, implements the collection management method provided in the preceding embodiments.

It is to be noted that the preceding computer-readable medium in the present disclosure may be a computer-readable signal medium or a computer-readable storage medium, or any combination thereof. The computer-readable storage medium, for example, may be, but is not limited to, an electronic, magnetic, optical, electromagnetic, infrared, or semiconductor system, apparatus, or device, or any combination thereof. More specific examples of the computer-readable storage medium may include, but are not limited to, an electrical connection with one or more wires, a portable computer magnetic disk, a hard disk, a random-access memory (RAM), a read-only memory (ROM), an erasable programmable read-only memory (EPROM), a flash memory, an optical fiber, a portable compact disk read-only memory (CD-ROM), an optical memory device, a magnetic memory device, or any appropriate combination thereof. In the present disclosure, the computer-readable storage medium may be any tangible medium including or storing a program. The program may be used by or used in conjunction with an instruction execution system, apparatus, or device. In the present disclosure, the computer-readable signal medium may include a data signal propagated on a baseband or as a part of a carrier, and computer-readable program codes are carried in the data signal. The data signal propagated in this manner may be in multiple forms and includes, and is not limited to, an electromagnetic signal, an optical signal, or any suitable combination thereof. The computer-readable signal medium may also be any computer-readable medium other than the computer-readable storage medium. The computer-readable signal medium may send, propagate, or transmit a program used by or in conjunction with an instruction execution system, apparatus, or device. The program codes included on the computer-readable medium may be transmitted via any appropriate medium which includes, but is not limited to, a wire, an optical cable, a radio frequency (RF), or any appropriate combination thereof.

In some embodiments, clients and servers may communicate using any currently known or future developed network protocol, such as HTTP (HyperText Transfer Protocol), and may be interconnected with any form or medium of digital data communication (such as a communication network). Examples of the communication network include a local area network (LAN), a wide area network (WAN), an internet (such as the Internet), and a peer-to-peer network (such as an Ad-Hoc network), as well as any currently known or future developed network.

The computer-readable medium may be included in the electronic device or may exist alone without being assembled into the electronic device.

The computer-readable medium carries one or more programs. When the one or more programs are executed by the electronic device, the electronic device is configured to, in response to a collection control triggering operation, when a collection operation object corresponding to the collection control triggering operation is in a collected state, determine collection association information corresponding to the collection control triggering operation; and generate a collection association page based on the collection association information, and display the collection association page in an interaction interface.

Computer program codes for performing the operations in the present disclosure may be written in one or more programming languages or combination thereof. The preceding one or more programming languages include, but are not limited to, object-oriented programming languages such as Java, Smalltalk, and C++, as well as conventional procedural programming languages such as C or similar programming languages. Program codes may be executed entirely on a user computer, partly on a user computer, as a stand-alone software package, partly on a user computer and partly on a remote computer, or entirely on a remote computer or a server. In the case relate to the remote computer, the remote computer may be connected to the user computer via any kind of network including a local area network (LAN) or a wide area network (WAN), or may be connected to an external computer (for example, via the Internet through an Internet service provider).

The flowcharts and block diagrams in the drawings show the possible architecture, function, and operation of the system, method, and computer program product according to various embodiments of the present disclosure. In this regard, each block in the flowcharts or block diagrams may represent a module, a program segment, or part of codes that contains one or more executable instructions for implementing specified logical functions. It is also to be noted that in some alternative implementations, the functions marked in the blocks may occur in an order different from those marked in the drawings. For example, two successive blocks may, in fact, be executed substantially in parallel or in a reverse order, which depends on the functions involved. It is also to be noted that each block in the block diagrams and/or flowcharts and a combination of blocks in the block diagrams and/or flowcharts may be implemented by a special-purpose hardware-based system which executes specified functions or operations, or a combination of special-purpose hardware and computer instructions.

The units involved in the embodiments of the present disclosure may be implemented by software or hardware. The name of a unit is not intended to limit the unit in a certain circumstance.

The functions described above herein may be executed, at least partially, by one or more hardware logic components. For example, and without limitations, example types of hardware logic components that may be used include a field-programmable gate array (FPGA), an application-specific integrated circuit (ASIC), an application-specific standard product (ASSP), system on a chip (SOC), a complex programmable logic device (CPLD), and the like.

In the context of the present disclosure, the machine-readable medium may be a tangible medium that may include or store a program that is used by or used in conjunction with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination thereof. More specific examples of the machine-readable storage medium may include an electrical connection based on one or more wires, a portable computer disk, a hard disk, a random-access memory (RAM), a read-only memory (ROM), an erasable programmable read-only memory (EPROM) or a flash memory, an optical fiber, a portable compact disc read-only memory (CD-ROM), an optical storage device, a magnetic storage device, or any suitable combination thereof.

According to one or more embodiments of the present disclosure, example one provides a collection management method. The method includes, in response to a collection control triggering operation, when a collection operation object corresponding to the collection control triggering operation is in a collected state, determining collection association information corresponding to the collection control triggering operation; and generating a collection association page based on the collection association information, and displaying the collection association page in an interaction interface.

According to one or more embodiments of the present disclosure, example two provides a collection management method. The method also includes that the collection control triggering operation includes a click operation on a collection control, where the click operation includes a single click operation and multiple click operations.

According to one or more embodiments of the present disclosure, example three provides a collection management method. The method also includes determining collection association information corresponding to the collection control triggering operation, including, when the collection control triggering operation is triggered in the display interface of the collection operation object, determining collection cancellation guide information and collection management guide information as the collection association information.

Correspondingly, generating the collection association page based on the collection association information includes generating a collection management guide component based on the collection management guide information and generating a collection cancellation guide component based on the collection cancellation guide information, where the collection management guide component is configured to guide a user to manage a collection object, and the collection cancellation guide component is configured to guide the user to cancel a collection operation of the collection operation object; and forming a collection association page according to the collection management guide component and the collection cancellation guide component.

According to one or more embodiments of the present disclosure, example four provides a collection management method. The method also includes, in response to a management component triggering operation on the collection management guide component, determining an operation user identifier corresponding to the management component triggering operation; and determining a reference collection category corresponding to the operation user identifier, generating a collection category management page based on the reference collection category, and displaying the collection category management page in an interaction interface.

According to one or more embodiments of the present disclosure, example five provides a collection management method. The method also includes, in response to a selection operation on the reference collection category in the collection category management page, determining a selected reference collection category; and acquiring a selected reference category collection object corresponding to the selected reference collection category, generating a collection category display page based on the selected reference category collection object and the collection operation object, and displaying the collection category display page in an interaction interface.

According to one or more embodiments of the present disclosure, example six provides a collection management method. The method also includes, in response to a selection operation on the reference collection category in the collection category management page, determining a selected reference collection category; and acquiring an association collection category corresponding to the collection operation object; and generating a collection category recommendation page based on the selected reference collection category and the association collection category, and displaying the collection category recommendation page in an interaction interface.

According to one or more embodiments of the present disclosure, example seven provides a collection management method. The method also includes, in response to a selection operation on the association collection category in the collection category recommendation page, determining a selected association collection category; acquiring a selected association category collection object corresponding to the selected association collection category; and generating a collection object recommendation page based on the selected association category collection object, and displaying the collection object recommendation page in an interaction interface.

According to one or more embodiments of the present disclosure, example eight provides a collection management method. The method also includes determining collection management information corresponding to the collection control triggering operation, including, when the collection control triggering operation is triggered in a collection management interface, determining collection cancellation guide information and collection folder entry information as the collection association information.

Correspondingly, generating the collection association page based on the collection association information includes generating a collection folder entry component based on the collection folder entry information, and generating a collection cancellation guide component based on the collection cancellation guide information, where the collection cancellation guide component is configured to guide a user to cancel a collection operation on the collection operation object; and forming a collection association page according to the collection management guide component and the collection cancellation guide component.

According to one or more embodiments of the present disclosure, example nine provides a collection management method. The method also includes, in response to an entry component triggering operation on the collection folder entry component, determining an operation user identifier corresponding to the entry component triggering operation; acquiring collection folder display information corresponding to the operation user identifier; and generating a collection folder display page based on the collection folder display information, and displaying the collection folder display page in an interaction interface.

According to one or more embodiments of the present disclosure, example ten provides a collection management apparatus. The apparatus includes a collection association information acquisition module and a collection association page display module.

The collection association information acquisition module is configured to, in response to a collection control triggering operation, determine collection association information corresponding to the collection control triggering operation when a collection operation object corresponding to the collection control triggering operation is in a collected state.

The collection association page display module is configured to generate a collection association page based on the collection association information and display the collection association page in an interaction interface.

The preceding description is merely illustrative of preferred embodiments of the present disclosure and the technical principles used therein. Those skilled in the art should understand that the scope referred to in the disclosure is not limited to the technical solutions formed by the particular combination of the preceding technical features, but intended to cover other technical solutions which may be formed by any combination of the preceding technical features or their equivalents without departing from the concept of the disclosure. For example, technical solutions formed by mutual substitutions of the preceding feature and the technical features disclosed in the present disclosure (but not limited to) that have similar functions.

In addition, although the operations are depicted in a particular order, this should not be construed as requiring that such operations should be executed in the particular order shown or in a sequential order. In certain circumstances, multitasking and parallel processing may be advantageous. Similarly, although specific implementation details are included in the preceding discussion, these should not be construed as limiting the scope of the present disclosure. Some features described in the context of separate embodiments may also be implemented in combination in a single embodiment. Conversely, various features described in the context of a single embodiment may also be implemented in multiple embodiments, individually, or in any suitable sub-combination.

Although the subject matter is described in the language specific to structural features and/or methodological logic acts, it is to be understood that the subject matter limited in the appended claims is not necessarily limited to the specific features or acts described above. Conversely, the specific features and acts described above are merely example forms of implementing the claims.

What is claimed is:

1. A collection management method, comprising:
in response to a collection control triggering operation, when a collection operation object corresponding to the collection control triggering operation is in a collected state, determining collection association information corresponding to the collection control triggering operation; and
generating a collection association page based on the collection association information, and displaying the collection association page in an interaction interface;
wherein determining the collection association information corresponding to the collection control triggering operation comprises:
when the collection control triggering operation is triggered in a display interface of a collection operation object, determining collection cancellation guide information and collection management guide information as the collection association information; and
generating the collection association page based on the collection association information comprises:
generating a collection management guide component based on the collection management guide information, and generating a collection cancellation guide component based on the collection cancellation guide information, wherein the collection management guide component is configured to guide a user to manage a collection object, and the collection cancellation guide component is configured to guide the user to cancel a collection operation of the collection operation object; and
forming the collection association page according to the collection management guide component and the collection cancellation guide component.

2. The method according to claim 1, wherein the collection control triggering operation comprises a click operation on a collection control, and the click operation comprises a single click operation and a plurality of click operations.

3. The method according to claim 1, further comprising:
in response to a management component triggering operation on the collection management guide component, determining an operation user identifier corresponding to the management component triggering operation; and
determining a reference collection category corresponding to the operation user identifier, generating a collection category management page based on the reference collection category, and displaying the collection category management page in an interaction interface.

4. The method according to claim 3, further comprising:
in response to a selection operation on the reference collection category in the collection category management page, determining a selected reference collection category; and
acquiring a selected reference category collection object corresponding to the selected reference collection category, generating a collection category display page based on the selected reference category collection object and the collection operation object, and displaying the collection category display page in the interaction interface.

5. The method according to claim 3, further comprising:
in response to a selection operation on the reference collection category in the collection category management page, determining a selected reference collection category;
acquiring an association collection category corresponding to the collection operation object; and
generating a collection category recommendation page based on the selected reference collection category and the association collection category, and displaying the collection category recommendation page in the interaction interface.

6. The method according to claim 5, further comprising:
in response to a selection operation on the association collection category in the collection category recommendation page, determining a selected association collection category;
acquiring a selected association category collection object corresponding to the selected association collection category; and
generating a collection object recommendation page based on the selected association category collection object, and displaying the collection object recommendation page in the interaction interface.

7. An electronic device, comprising:
one or more processors, and
a storage apparatus configured to store one or more programs,
wherein when executed by the one or more processors, the one or more programs cause the one or more processors to implement a collection management method, and the collection management method comprises:
in response to a collection control triggering operation, when a collection operation object corresponding to the collection control triggering operation is in a collected state, determining collection association information corresponding to the collection control triggering operation; and
generating a collection association page based on the collection association information, and displaying the collection association page in an interaction interface;
wherein determining the collection association information corresponding to the collection control triggering operation comprises:
when the collection control triggering operation is triggered in a display interface of a collection operation object, determining collection cancellation guide information and collection management guide information as the collection association information; and
generating the collection association page based on the collection association information comprises:
generating a collection management guide component based on the collection management guide information, and generating a collection cancellation guide component based on the collection cancellation guide information, wherein the collection management guide component is configured to guide a user to manage a collection object, and the collection cancellation guide component is configured to guide the user to cancel a collection operation of the collection operation object; and
forming the collection association page according to the collection management guide component and the collection cancellation guide component.

8. The electronic device according to claim 7, wherein the collection control triggering operation comprises a click operation on a collection control, and the click operation comprises a single click operation and a plurality of click operations.

9. The electronic device according to claim 7, further comprising:
   in response to a management component triggering operation on the collection management guide component, determining an operation user identifier corresponding to the management component triggering operation; and
   determining a reference collection category corresponding to the operation user identifier, generating a collection category management page based on the reference collection category, and displaying the collection category management page in an interaction interface.

10. The electronic device according to claim 9, further comprising:
    in response to a selection operation on the reference collection category in the collection category management page, determining a selected reference collection category; and
    acquiring a selected reference category collection object corresponding to the selected reference collection category, generating a collection category display page based on the selected reference category collection object and the collection operation object, and displaying the collection category display page in the interaction interface.

11. The electronic device according to claim 9, further comprising:
    in response to a selection operation on the reference collection category in the collection category management page, determining a selected reference collection category;
    acquiring an association collection category corresponding to the collection operation object; and
    generating a collection category recommendation page based on the selected reference collection category and the association collection category, and displaying the collection category recommendation page in the interaction interface.

12. The electronic device according to claim 11, further comprising:
    in response to a selection operation on the association collection category in the collection category recommendation page, determining a selected association collection category;
    acquiring a selected association category collection object corresponding to the selected association collection category; and
    generating a collection object recommendation page based on the selected association category collection object, and displaying the collection object recommendation page in the interaction interface.

13. A non-transitory storage medium comprising a computer-executable instruction which, when executed by a computer processor, is configured to execute the collection management method of claim 1.

14. The non-transitory storage medium according to claim 13, wherein a collection control triggering operation comprises a click operation on a collection control, and the click operation comprises a single click operation and a plurality of click operations.

15. A collection management method, comprising:
    in response to a collection control triggering operation, when a collection operation object corresponding to the collection control triggering operation is in a collected state, determining collection association information corresponding to the collection control triggering operation; and
    generating a collection association page based on the collection association information, and displaying the collection association page in an interaction interface;
    wherein determining collection management information corresponding to the collection control triggering operation comprises:
    when the collection control triggering operation is triggered in a collection management interface, determining collection cancellation guide information and collection folder entry information as the collection association information; and
    generating the collection association page based on the collection association information comprises:
    generating a collection folder entry component based on the collection folder entry information, and generating a collection cancellation guide component based on the collection cancellation guide information, wherein the collection cancellation guide component is configured to guide a user to cancel a collection operation on the collection operation object; and
    forming the collection association page according to the collection folder entry component and the collection cancellation guide component.

16. The method according to claim 15, further comprising:
    in response to an entry component triggering operation on the collection folder entry component, determining an operation user identifier corresponding to the entry component triggering operation; and
    acquiring collection folder display information corresponding to the operation user identifier; and
    generating a collection folder display page based on the collection folder display information, and displaying the collection folder display page in an interaction interface.

* * * * *